US011133552B2

(12) United States Patent
Kellner et al.

(10) Patent No.: US 11,133,552 B2
(45) Date of Patent: Sep. 28, 2021

(54) BATTERY MODULE INCLUDING HEAD PLATES PRETENSIONING BATTERY CELL PACKAGE IN HOUSING

(71) Applicant: Dr. Ing. h.c. F. Porsche Aktiengesellschaft, Stuttgart (DE)

(72) Inventors: Philipp Kellner, Rennigen (DE); Jens Bohlien, Stuttgart (DE); Meike Kollmannthaler, Leonberg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 13 days.

(21) Appl. No.: 16/444,061

(22) Filed: Jun. 18, 2019

(65) Prior Publication Data
US 2020/0020900 A1    Jan. 16, 2020

(30) Foreign Application Priority Data

Jul. 11, 2018 (DE) .......................... 102018116734.2

(51) Int. Cl.
*H01M 50/20* (2021.01)
*B60K 1/04* (2019.01)
*H01M 10/48* (2006.01)
*H01M 50/147* (2021.01)

(52) U.S. Cl.
CPC .............. *H01M 50/20* (2021.01); *B60K 1/04* (2013.01); *H01M 10/482* (2013.01); *H01M 50/147* (2021.01); *H01M 2220/20* (2013.01)

(58) Field of Classification Search
CPC .... H01M 2/1077; H01M 2/04; H01M 10/482; B60K 1/04
USPC ................................. 429/156, 158, 159, 160
See application file for complete search history.

(56) References Cited

U.S. PATENT DOCUMENTS

| 2010/0190049 | A1* | 7/2010 | Kawase | H01M 10/0481 |
| | | | | 429/159 |
| 2012/0045686 | A1* | 2/2012 | Jung | H01M 6/42 |
| | | | | 429/159 |
| 2015/0214570 | A1* | 7/2015 | Deponte | H01M 2/1653 |
| | | | | 429/99 |
| 2019/0229310 | A1* | 7/2019 | Fujishima | H01M 2/1077 |

FOREIGN PATENT DOCUMENTS

| DE | 102014218126 A1 | * | 3/2016 | ........ H01M 10/6556 |
| DE | 102016205929 A1 | | 10/2017 | |
| JP | 2007294407 A | * | 11/2007 | |
| JP | 2012160347 A | * | 8/2012 | ........ H01M 10/6556 |
| WO | WO-2017063874 A1 | * | 4/2017 | ........ H01M 10/0525 |

* cited by examiner

*Primary Examiner* — Sean P Cullen
(74) *Attorney, Agent, or Firm* — RatnerPrestia

(57) ABSTRACT

A battery module for a motor vehicle includes a battery module housing, at least one battery cell package which is inserted into the battery module housing in an assembly direction, at least two battery cells which are connected electrically in series, and two head plates for closing the battery module housing. The head plates are arranged and configured in order to indirectly or directly exert a pretensioning force onto the battery cell package in the assembly direction.

17 Claims, 2 Drawing Sheets

BATTERY MODULE INCLUDING HEAD PLATES PRETENSIONING BATTERY CELL PACKAGE IN HOUSING

CROSS-REFERENCE TO RELATED APPLICATION

This application claims priority to German Patent application No. DE 10 2018 116 734.2, filed Jul. 11, 2018, which is incorporated by reference herein in its entirety.

FIELD OF THE INVENTION

The invention relates to a battery module for a motor vehicle, and to a method for assembling a battery module of this kind. The battery module can be a battery module of a motor vehicle battery, in particular of a motor vehicle traction battery.

BACKGROUND OF THE INVENTION

The prior art discloses battery modules which comprise a battery module housing and a large number of battery cells which are electrically interconnected and are arranged in the form of a battery cell package within the battery module housing.

During operation of the battery cells (charging/discharging), expansion of the battery cells, so-called swelling, can occur. Expansion of the battery cells can lead to a reduction in the service life of the battery cells. In order to prevent the reduction in the service life, the prior art discloses pretensioning battery cells by means of metal tensioning straps before said battery cells are inserted into the battery module housing.

SUMMARY OF THE INVENTION

Described herein is a battery module which is simple to assemble and exhibits an increased service life.

According to one aspect of the invention, a battery module for a motor vehicle, comprises a battery module housing, at least one battery cell package which is inserted into the battery module housing in an assembly direction and comprises at least two battery cells which are connected electrically in series, and two head plates for closing the battery module housing, wherein the head plates are arranged and designed in order to indirectly or directly exert a pretensioning force onto the battery cell package in the assembly direction.

According to another aspect of the invention, a method for assembling a battery module, comprises the following method steps: providing a battery module housing, at least one battery cell package which comprises at least two battery cells which are connected electrically in series, and two head plates; inserting the at least one battery cell package into the battery module housing in an assembly direction; and closing the battery module housing and indirectly or directly pretensioning the at least one battery cell package in the assembly direction by way of the head plates.

The battery module according to aspects of the invention comprises a battery module housing, at least one battery cell package which is inserted into the battery module housing in an assembly direction and comprises at least two battery cells which are connected electrically in series, and two head plates for closing the battery module housing. The head plates are arranged and designed in order to indirectly or directly exert a pretensioning force onto the battery cell package in the assembly direction.

This refinement allows assembly of the battery module to be simplified and at the same time allows a long service life of the battery module to be achieved. The invention is particularly advantageous when used with load-bearing battery modules since the battery module housing already meets the requirements in respect of structural mechanics (wall thicknesses, strength . . . ) for absorbing the expansion forces of the battery cells on account of crash requirements of the motor vehicle without further adjustments to the battery module housing.

In a preferred refinement, the battery module comprises at least two battery cell packages which are arranged one behind the other in the assembly direction, wherein the head plates are arranged and designed in order to indirectly or directly exert a pretensioning force onto the battery cell packages in the assembly direction.

With preference, a first battery cell package of the at least two battery cell packages is inserted into the battery module housing along a first assembly direction and a second battery cell package of the at least two battery cell packages is inserted into said battery module housing along a second assembly direction, wherein the second assembly direction runs opposite to the first assembly direction.

In a preferred refinement, the battery module housing surrounds the battery cell package or the battery cell packages from four sides, wherein an opening is arranged on each of the other two sides of the battery module housing, the battery cell package being inserted into the battery module housing in the assembly direction, preferably in the first assembly direction and/or in the second assembly direction, through said opening and said opening being closed by means of one of the head plates.

The head plates are preferably connected in an interlocking and/or force-fitting and/or cohesive manner, preferably screwed or welded, to the battery module housing.

In a preferred refinement, the battery module further comprises at least one spring element which is arranged between the head plates and the battery cell package and/or between the battery cell packages.

The spring element can serve to pretension the battery cell packages and to compensate for the expansion of the battery cells.

The at least one spring element is preferably designed as a leaf or plate spring.

In a preferred refinement, the spring element is manufactured from steel or fiber-reinforced plastic, in particular from glass fiber-reinforced plastic.

The spring element is preferably designed in order to exert a substantially constant force onto the battery cell package and/or the head plate by way of its spring travel. The service life of the battery cells can be further improved in this way.

In a preferred refinement, the battery module further comprises at least one compensation element which is arranged for tolerance compensation between the head plates and the battery cell package and/or between the battery cell packages.

The invention further relates to a method for assembling a battery module, comprising the following method steps:
  providing a battery module housing, at least one battery cell package which comprises at least two battery cells which are connected electrically in series, and two head plates;
  inserting the at least one battery cell package into the battery module housing in an assembly direction; and closing the battery module housing and indirectly or directly pretensioning the at least one battery cell package in the assembly direction by way of the head plates.

In a preferred refinement, at least two battery cell packages are arranged in the battery module housing one behind the other in the assembly direction, wherein the at least two battery cell packages are pretensioned in the assembly direction by means of the head plates.

With preference, a first battery cell package of the at least two battery cell packages is inserted into the battery module housing along a first assembly direction and a second battery cell package of the at least two battery cell packages is inserted into said battery module housing along a second assembly direction, wherein the second assembly direction runs opposite to the first assembly direction.

In a preferred refinement, the battery module housing surrounds the battery cell package or the battery cell packages from four sides, wherein an opening is arranged on each of the other two sides of the battery module housing, characterized in that the battery cell package is inserted into the battery module housing through one of the openings in the assembly direction.

For the purpose of closing the battery module housing and for the purpose of indirectly or directly pretensioning the at least one battery cell package in the assembly direction, the head plates are preferably connected in an interlocking and/or force-fitting and/or cohesive manner, preferably screwed or welded, to the battery module housing.

In a preferred refinement, at least one spring element is arranged between the head plate and the battery cell package and/or between the battery cell packages, wherein a substantially constant force is exerted onto the battery cell package and/or the head plate preferably by means of the spring element by way of its spring travel.

At least one compensation element is preferably arranged between the head plate and the battery cell package and/or between the battery cell packages, wherein tolerances between the head plates and the battery cell package and/or between the battery cell packages are preferably compensated for by means of the compensation element.

BRIEF DESCRIPTION OF THE DRAWING

Details and further advantages of the battery module according to aspects of the invention and of the method according to aspects of the invention for assembling a battery module are explained with reference to the exemplary embodiment described below. In the drawing.

DETAILED DESCRIPTION OF THE INVENTION

Figure 1:
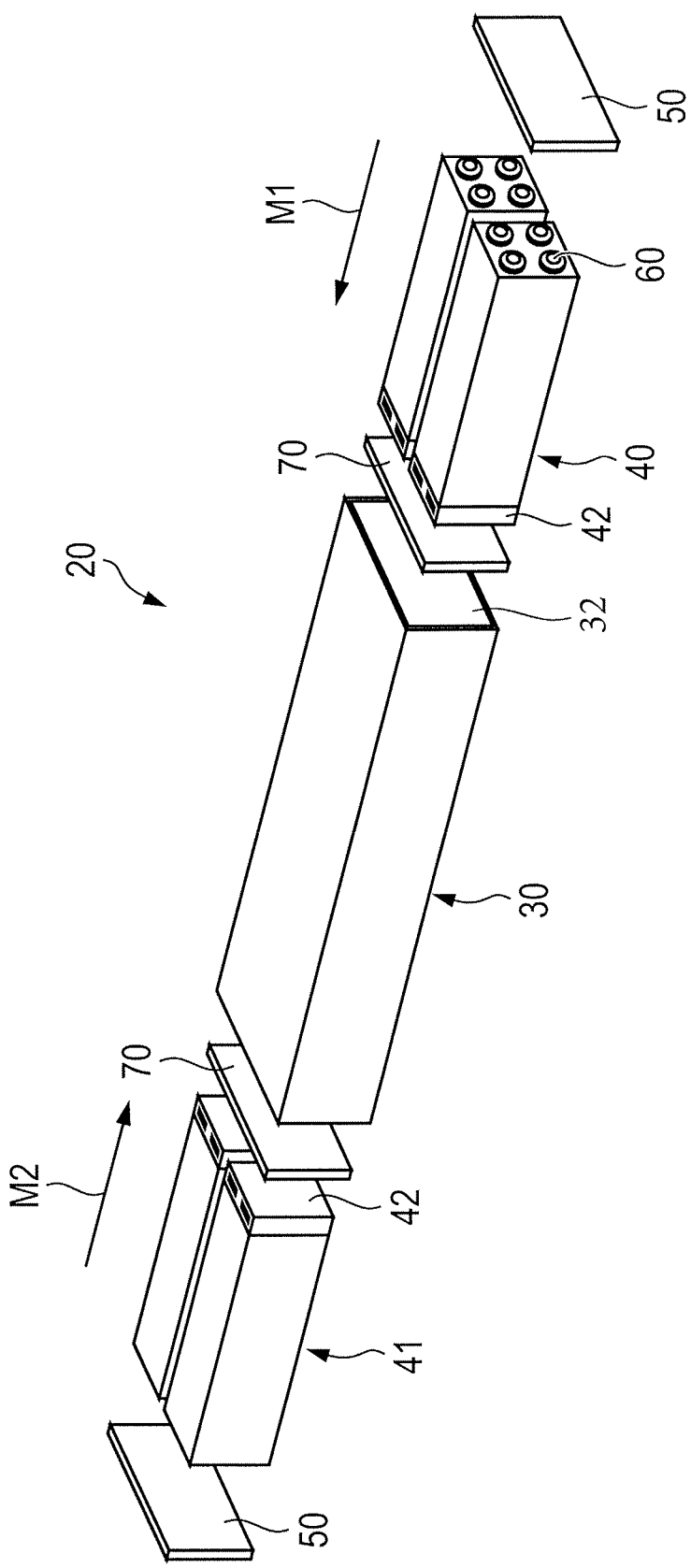
FIGS. 1 and 2 show a perspective view of a battery module in line one exemplary embodiment.
Figure 2:
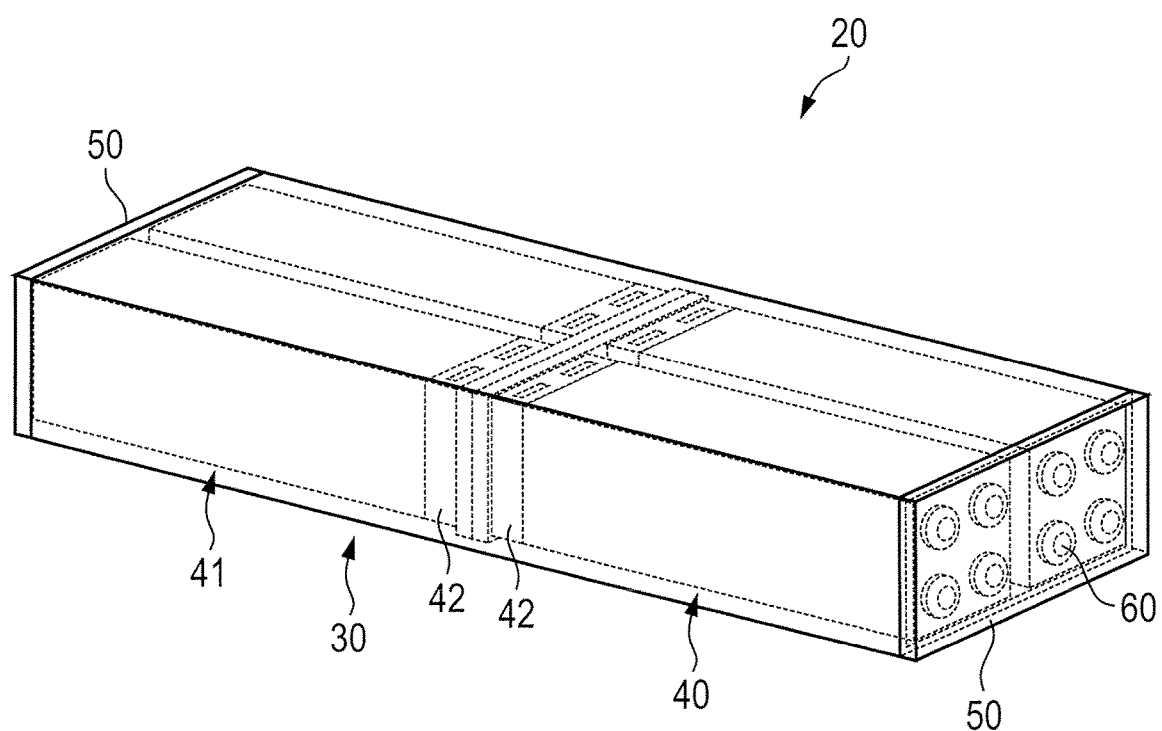

Referring now to FIGS. 1 and 2, a battery module 20 for a motor vehicle is depicted. The battery module 20 comprises a battery module housing 30, at least one battery cell package 40, 41 which is inserted into the battery module housing 30 in an assembly direction M1, M2 and comprises at least two battery cells which are connected electrically in series, and two head plates 50 for closing the battery module housing 30. The head plates 50 are arranged and designed in order to indirectly or directly exert a pretensioning force onto the battery cell package 40, 41 in the assembly direction M1, M2. FIG. 2 shows the battery module 20 in line with the exemplary embodiment in an assembled state.

The battery module can comprise at least two battery cell packages 40, 41 which are arranged one behind the other in the assembly direction M1, M2. The head plates 50 can be arranged and designed in order to indirectly or directly exert a pretensioning force onto the battery cell packages 40, 41 in the assembly direction M1, M2.

The battery cell packages 40, 41 can comprise a carrier structure 42 at that end of the battery cell package 40, 41 which is inserted into the battery module housing 30 first. This is clear, in particular, from FIG. 1. The battery cell packages 40, 41 which are pretensioned by way of the head plates 50 can be mutually supported in the center of the battery module housing 30, in particular by means of their carrier structure 42. As an alternative, the battery cell packages 40, 41 can be supported in the center of the battery module housing 30 on the battery module housing 30 itself, in particular on a welded-in sleeve of the battery module housing 30. The carrier structure 42 can be manufactured from plastic. The batteries of the battery cell packages 40, 41 can be designed as pouch cells or prismatic cells. The battery module housing 30 can be of unipartite or multipartite design.

With preference, a first battery cell package 40 of the at least two battery cell packages 40, 41 is inserted into the battery module housing 30 along a first assembly direction M1 and a second battery cell package 41 of the at least two battery cell packages 40, 41 is inserted into said battery module housing along a second assembly direction M2, wherein the second assembly direction M2 runs opposite to the first assembly direction M1.

The battery module housing 30 can surround the battery cell package 40, 41 or the battery cell packages 40, 41 from four sides, as shown by FIG. 1 in particular. An opening 32 can be arranged on each of the other two sides of the battery module housing 30, the battery cell package 40, 41 being inserted into the battery module housing 30 in the assembly direction M1, M2 through said opening and said opening being closed by means of one of the head plates 50.

The head plates 50 can be connected in an interlocking and/or force-fitting and/or cohesive manner, preferably screwed or welded, to the battery module housing 30.

The battery module 20 can further comprise at least one spring element 60 which is arranged between the head plates 50 and the battery cell package 40, 41 and/or between the battery cell packages 40, 41. The spring element 60 can be designed to indirectly apply the pretensioning force onto the battery cell packages 40, 41. In this case, the head plates 50 exert the pretensioning force onto the spring elements 60 which pass on the pretensioning force to the battery cell packages 40, 41.

The at least one spring element 60 can be designed as a leaf or plate spring. The spring element 60 can be manufactured from steel or fiber-reinforced plastic, in particular from glass fiber-reinforced plastic.

The spring element 60 can be designed in order to exert a substantially constant force onto the battery cell package 40, 41 and/or the head plate 50 by way of its spring travel.

The battery module 20 can comprise at least one compensation element 70 which is arranged for tolerance compensation between the head plate 50 and the battery cell package 40, 41 and/or between the battery cell packages 40, 41. The compensation element 70 can be designed, for example, as a foam pad.

The application further relates to a method for assembling a battery module 20 according to the application. The method comprises the following method steps:

providing a battery module housing 30, at least one battery cell package 40, 41 which comprises at least two battery cells which are connected electrically in series, and two head plates 50;

inserting the at least one battery cell package 40, 41 into the battery module housing 30 in an assembly direction M1, M2; and closing the battery module housing 30 and indirectly or directly pretensioning the at least one battery cell package 40, 41 in the assembly direction M1, M2 by way of the head plates 50.

FIG. 2 shows a battery module 20 which is assembled using the method described herein.

At least two battery cell packages 40, 41 can be arranged in the battery module housing 30 one behind the other in the assembly direction M1, M2. The at least two battery cell packages 40, 41 can be pretensioned in the assembly direction M1, M2 by means of the head plates 50. In this case, a first battery cell package 40 of the battery cell packages 40, 41 can first be inserted into the battery module housing 30 along a first assembly direction M1 and then a second battery cell package 41 of the battery cell packages 40, 41 can be inserted into the battery module housing 30 along a second assembly direction M2.

The battery module housing 30 can surround the battery cell package 40, 41 or the battery cell packages 40, 41 from four sides. An opening 32 can be arranged on each of the other two sides of the battery module housing 30. The battery cell package 40, 41 can be inserted into the battery module housing 30 through one of the openings 32 in the assembly direction M1, M2.

For the purpose of closing the battery module housing 30 and for the purpose of indirectly or directly pretensioning the at least one battery cell package 40, 41 in the assembly direction M1, M2, the head plates 50 can be connected in an interlocking and/or force-fitting and/or cohesive manner, preferably screwed or welded, to the battery module housing 30.

At least one spring element 60 can be arranged between the head plate 50 and the battery cell package 40, 41 and/or between the battery cell packages 40, 41. A substantially constant force can be exerted onto the battery cell package 40, 41 and/or the head plate 50 by means of the spring element 60 by way of its spring travel.

At least one compensation element 70 can be arranged between the head plate 50 and the battery cell package 40, 41 and/or between the battery cell packages 40, 41. Tolerances between the head plates 50 and the battery cell package 40, 41 and/or between the battery cell packages 40, 41 can be compensated for by means of the compensation element 70.

What is claimed is:

1. A battery module for a motor vehicle, comprising:
a battery module housing,
two battery cell packages which are each inserted into the battery module housing in an assembly direction and wherein each battery cell package comprises at least two battery cells which are connected electrically in series,
two head plates for closing the battery module housing, wherein the head plates are arranged and configured in order to either indirectly or directly exert a pretensioning force onto the battery cell packages in the assembly direction;
at least one spring element which is arranged between one of the head plates and one of the battery cell packages; and at least one compressible compensation element which is separate from and arranged directly between the battery cell packages for tolerance compensation,
wherein no spring elements nor compensation elements are positioned between the two battery cells of each battery cell package.

2. The battery module as claimed in claim 1, wherein the head plates are connected to the battery module housing in an interlocking, force-fitting or cohesive manner.

3. The battery module as claimed in claim 1, wherein the at least one spring element is configured as a leaf or plate spring.

4. The battery module as claimed in claim 1, wherein the spring element is manufactured from steel, fiber-reinforced plastic, or glass fiber-reinforced plastic.

5. The battery module as claimed in claim 1, wherein the spring element is manufactured from fiber-reinforced plastic.

6. The battery module as claimed in claim 1, wherein the spring element is configured to exert a substantially constant force onto the battery cell packages or the head plate by way of a spring travel of the spring element.

7. The battery module as claimed in claim 1, wherein the at least one compressible compensation element is a foam pad.

8. The battery module as claimed in claim 1, wherein the battery cell packages are arranged one behind the other in the assembly direction, wherein the head plates are arranged and configured in order to indirectly or directly exert the pretensioning force onto the battery cell packages in the assembly direction.

9. The battery module as claimed in claim 1, wherein the battery module housing surrounds the battery cell packages from four sides, wherein an opening is arranged on each of two other sides of the battery module housing, the battery cell packages being configured to be inserted into the battery module housing in the assembly direction through said opening, and said opening being closed by means of one of the head plates.

10. The battery module as claimed in claim 1, further comprising a carrier structure that is mounted to one end of a first battery cell of one of the battery cell packages, wherein the carrier structure is sandwiched between said one end of the first battery cell and the compressible compensation element.

11. The battery module as claimed in claim 10, further comprising a second carrier structure that is mounted to one end of second battery cell of said one of the battery cell packages, wherein the second carrier structure is sandwiched between said one end of the second battery cell and the compressible compensation element.

12. The battery module as claimed in claim 11, wherein the compressible compensation element is sandwiched between said carrier structure and another carrier structure.

13. The battery module as claimed in claim 12, wherein each carrier structure is composed of plastic.

14. A method for assembling a battery module including (i) a battery module housing, (ii) two battery cell packages each of which has at least two battery cells which are connected electrically in series, and (iii) two head plates, said method comprising:
inserting the battery cell packages into the battery module housing in an assembly direction;
closing the battery module housing and either indirectly or directly pretensioning the battery cell packages in the assembly direction by way of the head plates;

arranging at least one spring element between the head plate and one of the battery cell packages to exert a substantially constant force onto the battery cell packages by way of a spring travel of the spring element; and arranging at least one compressible compensation element directly between the battery cell packages to compensate for tolerances between the battery cell packages, wherein the at least one compressible compensation element is separate from the battery cell packages, and wherein no spring elements nor compensation elements are positioned between the two battery cells of each battery cell package.

15. The assembly method as claimed in claim 14, wherein the battery cell packages are arranged in the battery module housing one behind the other in the assembly direction, and wherein the battery cell packages are pretensioned in the assembly direction by the head plates.

16. The assembly method as claimed in claim 14, wherein, for the purpose of closing the battery module housing and for the purpose of either indirectly or directly pretensioning the battery cell packages in the assembly direction, the head plates are connected to the battery module housing in an interlocking, force-fitting or cohesive manner.

17. The assembly method as claimed in claim 14, wherein the battery module housing surrounds the battery cell packages from four sides, wherein an opening is arranged on each of two other sides of the battery module housing, and wherein the battery cell packages are inserted into the battery module housing through the opening in the assembly direction.

* * * * *